(12) United States Patent
Obikawa et al.

(10) Patent No.: US 6,650,463 B2
(45) Date of Patent: Nov. 18, 2003

(54) ELECTROPHORETIC DISPLAY DEVICE

(75) Inventors: Tsuyoshi Obikawa, Suwa (JP); Makoto Katase, Suwa (JP); Satoshi Kinoshita, Suwa (JP); Masamitsu Uehara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/097,361

(22) Filed: Mar. 12, 2002

(65) Prior Publication Data

US 2002/0175891 A1 Nov. 28, 2002

(30) Foreign Application Priority Data

Mar. 13, 2001 (JP) ........................ 2001-070371
Mar. 13, 2001 (JP) ........................ 2001-070372

(51) Int. Cl.$^7$ ................. G02B 26/00; G01N 27/26
(52) U.S. Cl. ................. 359/296; 204/450; 204/600; 345/107
(58) Field of Search ............... 359/296, 250, 359/253; 345/105, 107; 204/450, 600

(56) References Cited

U.S. PATENT DOCUMENTS

| 4,032,226 A | * | 6/1977 | Groner ........................ 355/3 |
| 4,620,916 A | * | 11/1986 | Zwemer et al. ............. 359/296 |
| 6,392,786 B1 | * | 5/2002 | Albert ........................ 359/296 |

FOREIGN PATENT DOCUMENTS

| JP | 48-54899 | 8/1973 |
| JP | 48-55693 | 8/1973 |
| JP | 49-32038 | 8/1974 |
| JP | 55-6310 | 1/1980 |
| JP | 59-91480 | 5/1984 |
| JP | 2-141730 | 5/1990 |
| JP | 2-284124 | 11/1990 |
| JP | 3-266818 | 11/1991 |

OTHER PUBLICATIONS

"Microcapsule–type Electrophoretic Display (MC–EPD)", Hideyuki Kawai and Norihiko Kanae, Research & Development Division, NOK Corporation, pp. 237–240, 1999.

* cited by examiner

Primary Examiner—Hung Xuan Dang
Assistant Examiner—Tuyen Tra
(74) Attorney, Agent, or Firm—Michael T. Gabrik (57) ABSTRACT

A dispersion medium, for dispersing electrophoretic particles in an electrophoretic display device, contains an organic compound having two or more rings in its structural formula, where the organic compound comprises at least about 30% by weight of the dispersion medium. The thus constituted dispersion medium improves the reliability and response of the electrophoretic device. The organic compound comprises one or more of the materials defined by the structural formulae (1) to (4), wherein each of A1 to A6, C1, and C2 are ring compounds.

6 Claims, 1 Drawing Sheet

ELECTROPHORETIC DISPLAY DEVICE

BACKGROUND OF THE INVENTION

1. Field of the Invention

The present invention relates to an electrophoretic display device, and more particularly to an electrophoretic display device having an improved dispersion medium.

2. Description of the Related Art

Electrophoretic display devices, which use electrophoresis, are one type of non-emitting display device. Electrophoresis is a phenomonon whereby the Coulomb force causes microparticles (e.g., electrophoretic particles) charged naturally by dispersion to migrate when an electrical field is applied to a fluid dispersion medium in which the microparticles are contained.

The basic structure of an electrophoretic display includes first and second electrodes disposed in opposition with a specific space therebetween. This space is filled with an electrophoretic suspension. When a potential difference is applied between the electrodes, the electrophoretic particles are pulled to one or the other of the electrodes depending on the direction of the electrical field. If the dispersion medium is dyed with dye and pigment particles are used for the electrophoretic particles, the color of the pigment particles or the color of the dye can be seen from the viewing side of the display, that is, the side where the transparent substrate and transparent electrodes are disposed. An electrophoretic display thus comprised can therefore be used to display images by forming the electrodes in a desired pixel pattern and controlling the voltage applied to the pixel electrodes.

Dodecylbenzene is described as the dispersion medium in this type of electrophoretic display in, for example, a paper (in Japanese) entitled "An electrophoretic display using microcapsules" (Japan Hardcopy 1999 collection of papers, pp. 237 to 240) written by an engineer at NOK corp. This paper describes placing the electrophoretic suspension inside the microcapsules instead of directly filling the dispersion medium between the electrodes.

Japanese Patent Publication (kokoku) S49-32038 is directed to an electrophoretic display having cells disposed between the electrodes, dividing the electrophoretic suspension into pixel units. Migration of the electrophoretic particles is restricted to within their designated cells. Using such cells makes it possible to increase the image resolution of the electrophoretic display and easily develop a color display.

Using dodecylbenzene as the dispersion medium of the electrophoretic display, however, causes certain problems relating to reliability and response. Dodecylbenzene attacks the sealants used to inject and seal the suspension inside the display, and there is therefore a danger of the suspension being incompletely sealed in the display.

OBJECT OF THE INVENTION

An object of the present invention is therefore to improve the reliability and response of the electrophoretic display device by employing an improved dispersion medium.

SUMMARY OF THE INVENTION

To achieve this object, the present invention provides a dispersion medium in which electrophoretic particles are dispersed, wherein the dispersion medium includes at least one organic compound having a structural formula containing at least two rings. An electrophoretic display device including such a dispersion medium is also provided.

The at least one organic compound preferably comprises at least one material defined by any of the following structural formulae (1) to (4) shown below:

(1) X1-A1-B1-A2-Y1

(2) X2—A3—B2—A4—B3—A5—Z
                  |
                  Y2

(3) X3-C1

(4) X4-C2-B4-A6-Y3

The content of such organic compound(s) in the dispersion medium is preferably 30% by weight or more; more preferably, the content of such organic compound(s) is 80% by weight or more; and even more preferably, such organic compound(s) constitute 100% by weight of the dispersion medium.

In the formulas (1) to (4), each of A1 to A6 is at least one of a benzene ring, a cyclohexane ring, a dioxane ring, a pyrimidine ring, a furan ring, a tetrahydrofuran ring, a dithiane ring, a piperidine ring, a pyrazine ring, a morpholine ring, a cyclopentane ring, a cyclobutane ring, a pyridine ring, a thiophene ring, a pyrrole ring, or a cyclohexene ring.

In the formulas (1) to (4), each of X1 to X4, Y1 to Y3, and Z is at least one substituent selected from the group consisting of hydrogen, fluorine, chlorine, bromine, iodine, cyano, nitro, amino, hydroxyl, alkanoyloxy, alkoxycarbonyl, carboxy, trifluoromethyl, trifluoromethoxy, alkoxymethylene, alkyl, alkoxy, alkenyl, sulfonate, thioalkyl, monoalkylamino, dialkylamino, and trialkylamino.

In the formulas (1) to (4), each of B1 to B4 is either a single bond or comprises one of the following: COO, OCO, CH=N, N=CH, CH=CH, $(CH_2)_nO$, $O(CH_2)_n$, $(CH_2)_n$, $O(CH_2)_nO$, CH=CH—COO, OCO—CH=CH, O, CO, NHCO, CONH, N=N, $N_2O$, C≡C, SO, $SO_2$, or NH, where n is an integer from 1 to 10.

In the formulas (1) to (4), each of C1 and C2 comprises naphthalene, tetrahydronaphthalene, decahydronaphthalene, indene, quinoline, coumarin, azulene, fluorene, or dihydrophenanthrene.

Formulas (5) to (32) shown in Appendix A are more specific examples of compounds having any of the above structural formulas (1) to (4), where R1 to R33, X, and Y are as follows.

Each of R1 to R33 is an alkyl, alkoxy, alkoxymethelene, halogen elements, hydrogen, alkenyl, cyano, nitro, amino, hydroxyl, alkanoyloxy, alkoxycarbonyl, trifluoromethyl, carboxy, monoalkylamino, dialkylamino, trialkylamino sulfonate, thioalkyl, trifluoromethoxy, acyl, acyloxy, or formyl.

Each of X and Y is either a single bond or comprises one of the following: COO, OCO, CH=N, N=CH, CH=CH, $(CH_2)_nO$, $O(CH_2)_n$, $(CH_2)_n$, $O(CH_2)_nO$, CH=CH—COO, OCO—CH=CH, O, CO, NHCO, CONH, N=N, $N_2O$, C≡C, SO, $SO_2$, or NH, where n is an integer from 1 to 10.

Of these organic compounds, ones with small optical anistropy are preferably used. Scattering, birefringence, and optical rotatory polarization depending on the orientation of the molecules occur easily when an organic compound with large optical anistropy is used as the dispersion medium, and such compounds thus contribute to a drop in light uniformity. By using materials with small optical anistropy, and more preferably optically isotropic materials, highly uniform light can be obtained from each pixel of the electrophoretic display device, and a wide viewing angle can be achieved.

Examples of the organic compounds with small optical anisotropy denoted by any of structural formulae (1) to (4) above include cyclohexyl cyclohexane, phenylcyclohexane, phenylethylcyclohexane, phenylcyclohexanecarboxylate, 4-phenyl-1,3-dioxane, and 2-phenylethyl-1,3-dioxane types.

The present invention is ideally suited to an electrophoretic display device wherein the space between opposing electrodes is divided into cells representing switching pixel units, and migration of each electrophoretic particle is restricted to within the particular cell in which it is contained. Each cell is filled with a suspension having electrophoretic particles dispersed in a dispersion medium. Units of three adjacent cells form a group, and the three cells of each group are respectively filled with a suspension corresponding to red (R), green (G), and blue (B).

DESCRIPTION OF THE PREFERRED EMBODIMENTS

The preferred embodiments of the present invention are described below with reference to the accompanying figures.

An electrophoretic display system according to embodiments of the invention comprises an electrophoretic display panel and peripheral circuitry. However, because the distinguishing feature of the present invention is the suspension used in the electrophoretic display panel, the peripheral circuitry is not described below. An electrophoretic display panel according to embodiments of the invention is described below with reference to FIG. 1 and FIG. 2.

Figure 1:
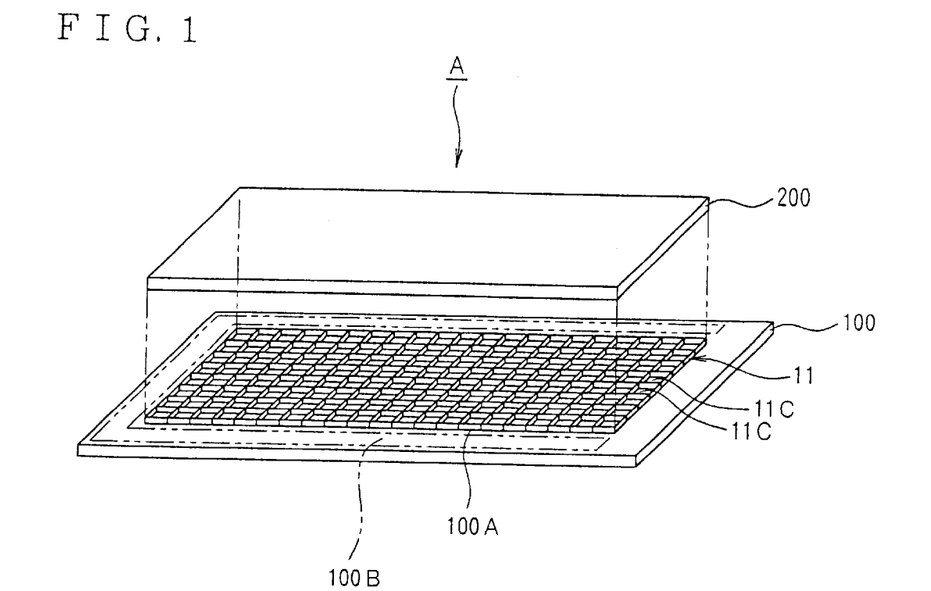
FIG. 1 is an oblique view showing an electrophoretic display panel of an electrophoretic display device according to a preferred embodiment of the present invention.
Figure 2:
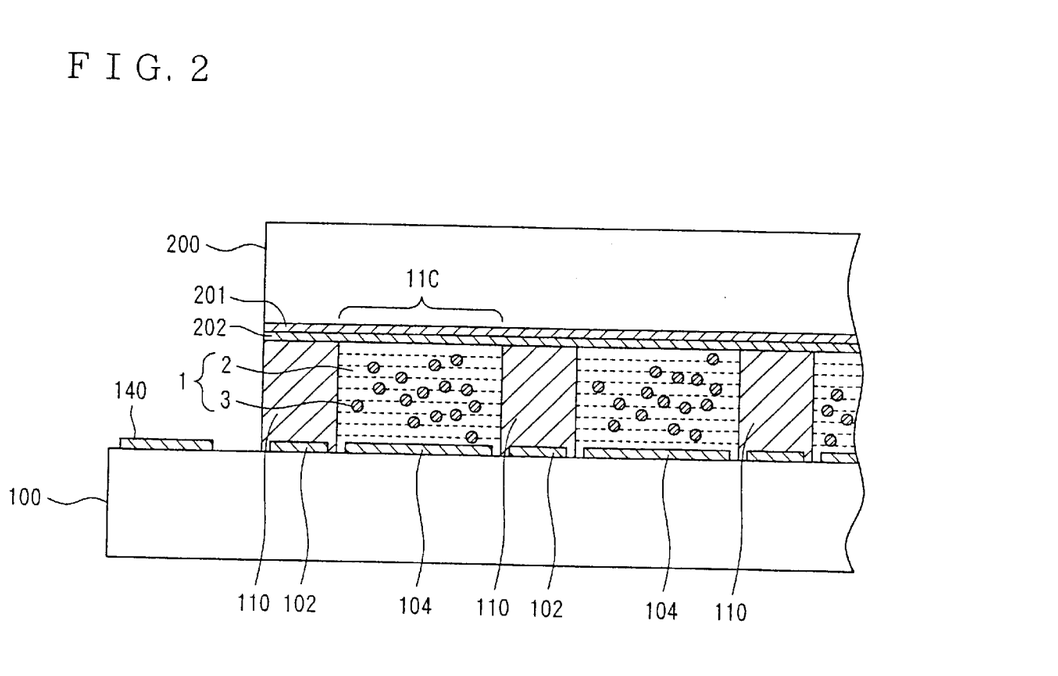
FIG. 2 is a partial section view of the electrophoretic display panel shown in FIG. 1.

Display panel A has a component substrate 100 with an opposing substrate 200 disposed in opposition thereto, and a cell grid 11 disposed between the substrates. FIG. 1 is an oblique view showing the opposing substrate 200 removed and raised above the component substrate 100, and FIG. 2 is a partial section view.

A common electrode 201 and then a sealant layer 202 are formed on the surface of the substrate 200 that is opposite the component substrate 100. The opposing substrate 200, common electrode 201, and sealant layer 202 are all transparent, and the outside of the opposing substrate 200 is the display surface (the viewing side) of display panel A.

Pixel electrodes 104, scan lines, data lines 102, and thin-film transistors functioning as switching elements are formed in the center (display area 100A) of the component substrate 100 on the surface opposing the opposing substrate 200. The scan line drive circuit, data line drive circuit 140, and external connection electrodes are formed in the area 100B around the outside of the display area 100A.

The cell grid 11 is formed over the display area 100A. Walls 110 of a constant height divide the space between component substrate 100 and opposing substrate 200 into a grid of cells 11C. The cell grid 11 can be formed by sequential steps of forming a film coating of a photosensitive polyimide precursor on the component substrate 100, exposing the film coating to ultraviolet rays though a mask corresponding to the cell pattern, and then developing.

The cells 11C divide the area between the electrodes (between common electrode 201 and pixel electrodes 104) into pixel units. Each cell 11C is filled with a suspension 1 having electrophoretic particles 3 dispersed in a dispersion medium 2. A surface active agent or other additive is added to this dispersion medium 2 as needed.

Because this display panel A is a full color display device, the cells 11C are grouped into units of three. That is, three adjacent cells form one group of cells. One cell in each group is filled with a suspension corresponding to red (R), another with a suspension corresponding to green (G), and the third with a suspension corresponding to blue (B).

Each color of suspension contains electrophoretic particles of the same color as the display color and dyes the dispersion medium a color that absorbs the display color (such as the complement of the display color). More specifically, the suspension for red uses red particles (such as ferric oxide particles) for the electrophoretic particles and has the dispersion medium dyed cyan. The suspension for green uses green particles (such as cobalt green pigment particles) for the electrophoretic particles and has the dispersion medium dyed magenta. The suspension for blue uses blue particles (such as cobalt blue pigment particles) for the electrophoretic particles and dyes the dispersion medium yellow.

Therefore, when the electrophoretic particles 3 are attracted to common electrode 201, and hence toward the display or viewing surface side of panel A, light passing through the opposing substrate 200 and common electrode 201 and incident on the suspension 1 is directly reflected by the electrophoretic particles 3 on the side of the common electrode 201. Most of the reflected light (light of the wavelength corresponding to the display color) is therefore not absorbed and light of the wavelength corresponding to the display color is emitted. The display color can therefore be seen from the viewing surface side.

When the electrophoretic particles 3 are attracted to the pixel electrodes 104 on the side of component substrate 100, light passing through opposing substrate 200 and common electrode 201 to the suspension 1 is reflected by the electrophoretic particles 3 on the side of the pixel electrodes 104 after passing through the suspension 1. The reflected light is then absorbed by the dispersion medium 2 as it passes through the suspension 1 to the common electrode 201, and red therefore cannot be seen from the viewing surface.

The position and distribution of the electrophoretic particles 3 between the electrodes can be controlled by the field strength applied to the suspension 1. It is therefore possible to adjust the color pixels in each group to a desired color so that a full color image can be presented on the display panel A by controlling the field strength applied to the suspension 1 in the cells of each color and thereby controlling the position and distribution of electrophoretic particles 3 in the cells of each color.

Compositions of the dispersion medium 2, according to embodiments 1 to 19, are shown in Appendix B.

Compared with a dispersion medium comprising organic compounds with a structural formula containing only one ring of dodecylbenzene, for example, dispersion media with compositions, according to embodiments of the present invention, do not easily evaporate while having low viscosity, and do not easily penetrate the sealant. It is therefore possible to improve electrophoretic display device reliability and response compared with using a dispersion medium comprising only dodecylbenzene.

While the present invention has been described in conjunction with preferred embodiments thereof, further alternatives, modifications, variations and applications will be apparent to those skilled in the art in light of the foregoing description. Thus, the invention described herein is intended to embrace all such alternatives, modifications, variations and applications as may fall within the spirit and scope of the appended claims.

-continued (20)(21)(22)(23)(24)(25)(26)(27)(28)(29)(30)(31)(32)

| | Compound | wt % |
|---|---|---|
| Embodiment 1 |  | 70 |
| |  | 30 |
| Embodiment 2 |  | 60 |
| |  | 40 |
| Embodiment 3 |  | 100 |
| Embodiment 4 |  | 100 |
| Embodiment 5 |  | 60 |
| |  | 40 |
| Embodiment 6 |  | 40 |
| |  | 20 |
| |  | 40 |
| Embodiment 7 |  | 25 |
| |  | 25 |

| | -continued | |
|---|---|---|
| | Compound | wt % |
| |  | 35 |
| |  | 15 |
| Embodiment 8 |  | 15 |
| |  | 15 |
| |  | 20 |
| |  | 20 |
| |  | 10 |
| |  | 10 |
| |  | 10 |
| Embodiment 9 |  | 10 |
| |  | 30 |
| |  | 25 |
| |  | 25 |
| |  | 10 |

-continued

| | Compound | wt % |
|---|---|---|
| Embodiment 10 | C₂H₅–[H]–[H]–CN | 20 |
| | CH₃–[piperazine]–[H]–F | 20 |
| | H–[dioxane]–CH₂CH–[phenyl]–CF₃ | 15 |
| | CH₃–[H]–[phenyl]–Cl | 20 |
| | CH₃–[H]–(CH₂)₆–[phenyl]–OH | 15 |
| | CH₃–[H]–[H]–(CH₂)₄–[phenyl(3,4-F₂)] | 10 |
| Embodiment 11 | H–[H]–COO–[phenyl(2,6-F₂)]–CN | 20 |
| | C₅H₁₁–[dioxane]–CH₂CH₂–[phenyl(3,4,5-F₃)] | 25 |
| | CH₃–[H]–[phenyl(3-F)]–CN | 25 |
| | C₃H₇–[H]–CONH–[phenyl(3-F)]–Cl | 15 |
| | CH₃–[H]–[H]–[phenyl(3-F)]–OCF₃ | 15 |

-continued

| | Compound | wt % |
|---|---|---|
| Embodiment 12 | $C_5H_{11}$—⟨Ph⟩—COO—⟨Ph⟩—F | 30 |
| | $C_2H_5$—⟨H⟩—$CH_2CH_2$—⟨Ph⟩—NO | 20 |
| | $CH_3$—⟨H⟩-naphthyl—$OCH$ | 30 |
| | $CH_3$—⟨H⟩—CH=CH—COO—⟨Ph⟩—$SCH_3$ | 20 |
| Embodiment 13 | $C_{12}H_{25}$—⟨H⟩—Cl | 20 |
| | $CH_3$—⟨cyclopentyl⟩—⟨Ph⟩—B | 25 |
| | $CH_3$—⟨H⟩—$(CH_2)_{10}$—⟨cyclobutyl⟩—$CH_3$ | 30 |
| | $C_5H_{11}$—⟨furan⟩—⟨H⟩—$CH_3$ | 25 |
| Embodiment 14 | $C_{12}H_{25}$—⟨H⟩—$CH_3$ | 30 |
| | $CH_3$—⟨H⟩—⟨H⟩—F | 20 |
| | $CH_3$—⟨H⟩—⟨H⟩—$CF_3$ | 20 |
| | $CH_3$—⟨piperazine⟩—⟨H⟩—$CH_2OCH_3$ | 20 |
| | $C_3H_5$—⟨H⟩—⟨H⟩—⟨Ph⟩—$OCF_3$ | 10 |
| Embodiment 15 | $C_{12}H_{25}$—⟨Ph⟩—CN | 30 |

-continued

| Compound | wt % |
|---|---|
| CH₃–⟨⟩–O(CH₂)₆–⟨⟩–F, F | 15 |
| C₅H₁₁–⟨⟨⟩⟩–OC₂H₅ (with F) | 15 |
| C₂H₅–⟨N⟩–⟨⟩–CH₃ | 20 |
| C₂H₅–⟨N,N⟩–⟨⟩–⟨⟩–Cl (with F) | 10 |
| C₃H₇–⟨H⟩–⟨⟨⟩⟩–⟨⟩–CN (with F) | 10 |

Embodiment 16

| Compound | wt % |
|---|---|
| C₁₂H₂₅O–⟨⟩ | 40 |
| CH₃–⟨⟩–CH₂CH₂–⟨⟩–OC₂H₅ | 15 |
| C₅H₁₁–⟨⟨⟩⟩–OC₂H₅ | 15 |
| C₂H₅–⟨N⟩–⟨⟩–CH₃ | 10 |
| C₂H₅–⟨H⟩–⟨⟩–⟨⟩–Cl | 10 |
| C₅H₁₁–⟨H⟩–⟨⟩–⟨⟩–⟨H⟩–C₂H₅ | 10 |

Embodiment 17

| Compound | wt % |
|---|---|
| C₁₂H₂₅–⟨⟩ | 30 |
| CH₃–⟨⟩–C≡C–⟨⟩–C₂H₅ | 20 |

-continued

| | Compound | wt % |
|---|---|---|
| | $C_2H_5-CH=CH-CH_2-\!\!\bigcirc\!\!-\!\!\bigcirc$ | 25 |
| | $C_2H_5-\text{[pyrimidine]}-\!\!\bigcirc\!\!-CH_3$ | 15 |
| | $C_2H_5-\!\!\bigcirc\!\!-\!\!\bigcirc\!\!-\!\!\bigcirc\!\!-CH_3$ | 10 |
| Embodiment 18 | $C_4H_9CO_2-\!\!\bigcirc\!\!-CH=N-\!\!\bigcirc\!\!-Cl$ | 25 |
| | $CH_3-\text{[pyrimidine]}-(CH_2)_8O-\!\!\bigcirc(Cl)\!\!-OCOCH_3$ | 25 |
| | $C_5H_{11}S-\text{[naphthalene]}(Cl)(I)$ | 35 |
| | $C_5H_{11}-\text{[Cy]}-\!\!\bigcirc\!\!-(CH_2)_4-\!\!\bigcirc\!\!-N(CH_2)_2$ | 15 |
| Embodiment 19 | $C_3H_7-\!\!\bigcirc\!\!-\!\!\bigcirc(F)(F)\!\!-CN$ | 25 |
| | $CH_3-\!\!\bigcirc\!\!-COO-\!\!\bigcirc(F)(F)(F)$ | 25 |
| | $C_2H_5OCH_2-\!\!\bigcirc\!\!-C\equiv C-\!\!\bigcirc(F)\!\!-CN$ | 20 |
| | $C_5H_{11}-\text{[pyrimidine]}-\!\!\bigcirc(F)(F)\!\!-CN$ | 20 |

| Compound | wt % |
|---|---|
|  | 10 |

What is claimed is:

1. An electrophoretic display device, comprising:
an electrophoretic suspension containing electrophoretic particles dispersed in a dispersion medium;
wherein the dispersion medium includes at least one organic compound, the at least one organic compound comprising at least one material defined by any of the following formulae:

X1-A1-B1-A2-Y1

X2—A3—B2—A4—B3—A5—Z
           |
           Y2

X3-C1

X4-C2-B4-A6-Y3 wherein each of A1 to A6 comprises at least one of a benzene ring, a cyclohexane ring, a dioxane ring, a pyrimidine ring, a furan ring, a tetrahydrofuran ring, a dithiane ring, a piperidine ring, a pyrazine ring, a morpholine ring, a cyclopentane ring, a cyclobutane ring, a pyridine ring, a thiophene ring, a pyrrole ring, or a cyclohexene ring;
wherein each of X1 to X4, Y1 to Y3, and Z comprises at least one substituent selected from the group consisting of hydrogen, fluorine, chlorine, bromine, iodine, cyano, nitro, amino, hydroxyl, alkanoyloxy, alkoxycarbonyl, carboxy, trifluoromethyl, trifluoromethoxy, alkoxymethylene, alkyl, alkoxy, alkenyl, sulfonate, thioalkyl, monoalkylamino, dialkylamino, and trialkylamino;
wherein each of B1 to B4 is either a single bond compound or comprises one of the following: COO, OCO, CH=N, N=CH, CH=CH, $(CH_2)_nO$, $O(CH_2)_n$, $(CH_2)_n$, $O(CH_2)_nO$, CH=CH—COO, OCO—CH=CH, O, CO, NHCO, CONH, N=N, $N_2O$, C≡C, SO, $SO_2$, or NH, where n is an integer from 1 to 10; and
wherein each of C1 and C2 comprises naphthalene, tetrahydronaphthalene, decahydronaphthalene, indene, quinoline, coumarin, azulene, fluorene, or dihydrophenanthrene.

2. An electrophoretic display device as described in claim 1, wherein the at least one organic compound comprises at least 30% by weight of the dispersion medium.

3. An electrophoretic display device as described in claim 1, further comprising at least two electrodes positioned so as to define a space therebetween in which the electrophoretic suspension is contained, wherein the space between the electrodes is divided into cells representing pixel units, and the migration of each electrophoretic particle is restricted to within the particular cell in which it is contained.

4. An electrophoretic display device as described in claim 3, wherein three adjacent cells form a group, and the three cells of each group are respectively filled with an electropheretic suspension corresponding to red (R), green (G), and blue (B).

5. A dispersion medium in which electrophoretic particles are dispersed,
wherein the dispersion medium includes at least one organic compound, the at least one organic compound comprising at least one material defined by any of the following formulae:

X1-A1-B1-A2-Y1

X2—A3—B2—A4—B3—A5—Z
           |
           Y2

X3-C1

X4-C2-B4-A6-Y3 wherein each of A1 to A6 comprises at least one of a benzene ring, a cyclohexane ring, a dioxane ring, a pyrimidine ring, a furan ring, a tetrahydrofuran ring, a dithiane ring, a piperidine ring, a pyrazine ring, a morpholine ring, a cyclopentane ring, a cyclobutane ring, a pyridine ring, a thiophene ring, a pyrrole ring, or a cyclohexene ring;
wherein each of X1 to X4, Y1 to Y3, and Z comprises at least one substituent selected from the group consisting of hydrogen, fluorine, chlorine, bromine, iodine, cyano, nitro, amino, hydroxyl, alkanoyloxy, alkoxycarbonyl, carboxy, trifluoromethyl, trifluoromethoxy, alkoxymethylene, alkyl, alkoxy, alkenyl, sulfonate, thioalkyl, monoalkylamino, dialkylamino, and trialkylamino;
wherein each of B1 to B4 is either a single bond compound or comprises one of the following: COO, OCO, CH=N, N=CH, CH=CH, $(CH_2)_nO$, $O(CH_2)_n$, $(CH_2)_n$, $O(CH_2)_nO$, CH=CH—COO, OCO—CH=CH, O, CO, NHCO, CONH, N=N, $N_2O$, C≡C, SO, $SO_2$, or NH, where n is an integer from 1 to 10; and
wherein each of C1 and C2 comprises naphthalene, tetrahydronaphthalene, decahydronaphthalene, indene, quinoline, coumarin, azulene, fluorene, or dihydrophenanthrene.

6. A dispersion medium as described in claim 5, wherein the at least one organic compound comprises at least 30% by weight of the dispersion medium.

* * * * *